United States Patent Office 3,074,959
Patented Jan. 22, 1963

3,074,959
CARBAZOLE COMPOUNDS
Henry M. Grotta, Delaware, Ohio, assignor, by mesne assignments, to Martin-Marietta Corporation, Chicago, Ill., a corporation of Maryland
No Drawing. Filed Mar. 27, 1961, Ser. No. 98,331
7 Claims. (Cl. 260—315)

The present invention relates to new carbazole compounds, and more particularly it relates to carbazole isocyanates, carbazole isothiocyanates, carbazole diisocyanates and carbazole diisothiocyanates, all of which have an unsubstituted imino group (N-unsubstituted at the 9 position of the carbazole molecule).

The compounds of the present invention are characterized by being carbazole derivatives with an unsubstituted, active imino group at the 9 position of the molecule and an additional reactive group or groups elsewhere in the molecule. Some of the compounds of the present invention are characterized by having relatively high melting points, e.g. 180° C. to 286° C., which renders them especially suitable for use in synthesizing polymers with high melting points.

The processes of the present invention are characterized by their ability to produce relatively high yields of carbazole isocyanates, carbazole isothiocyanates, carbazole diisocyanates and carbazole diisothiocyanates, all of which have an unsubstituted imino group at the 9 position of the carbazole molecule.

Carbazole itself has been known for many years and has been extensively used commercially in the production of some of the vat dyes. Carbazole is a relatively stable molecule with a relatively high melting point, i.e. 245° C. The stability results from the symmetrical arrangement of the molecular structure and its highly aromatic characteristics. However, carbazole itself is limited in its applications.

Certain isocyanate derivatives of carbazole have been suggested heretofore, but the original imino hydrogen at the 9 position of these molecules has been replaced by relatively unreactive radicals, thus blocking a potentially reactive site and rendering the molecule unfit for cross-linking at the 9 position. Also, these prior derivatives of carbazole are either oily or melt at a relatively low temperature, which renders them unsuitable for incorporation into polymers having high melting points.

The desirable physical and chemical properties of the carbazole structure can now be used to greater advantage because of the preparation of the novel carbazole derivatives in accordance with the present invention. Of particular interest are the carbazole compounds containing one or two isocyanate or isothiocyanate radicals. The mono-substituted carbazole isocyanate and mono-substituted carbazole isothiocyanate are useful in desirably modifying fibers that contain hydroxy groups, such as cotton. Carbazole diisocyanate and carbazole diisothiocyanate are useful in preparing more stable polyurethane resins. Many other uses will undoubtedly be found for these carbazole compounds now that they are available.

The new carbazole compounds that have been prepared in accordance with this invention may be generally identified by the following formula:

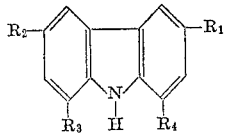

wherein $R_1$ and $R_2$ are radicals selected from the group consisting of hydrogen, isocyanate, and isothiocyanate radicals, except that $R_1$ and $R_2$ cannot both be hydrogen radicals; and $R_3$ and $R_4$ are radicals selected from the group consisting of hydrogen, halogen, alkyl, aryl, acyl, alkaryl, and aroyl radicals. In the above formula when $R_2$, $R_3$ and $R_4$ are hydrogen radicals the carbazole isocyanate or isothiocyanate is depicted. When $R_1$ and $R_2$ are both either isocyanate or isothiocyanate radicals, and $R_3$ and $R_4$ are hydrogen radicals, carbazole diisocyanate or carbazole diisothiocyanate is depicted. The unsubstituted 9 position (imino group) is a potentially reactive site in a polymer. The radicals $R_3$ and $R_4$ are important insofar as they affect the properties of the carbazole and a polymer made from the substituted carbazole.

A surprising feature of the new compounds provided by the present invention, especially the diisocyanates and diisothiocyanates, is the presence of both imine and isocyanate or isothiocyanate functionality in the same molecule, which has heretofore been considered impossible due to the high reactivity of each such radical. Thus, with these new compounds the reactive isocyanate groups can serve to introduce into a molecule (such as a urethane polymer or a urea) a group capable of many of the typical reactions of such groups, such as secondary amino acetylation, nitrosation, alkylation, etc. Both such groups are identifiable in the molecule by infrared spectrum, and their presence is unique and unexpected.

One process of the present invention comprises converting amino carbazoles or diaminocarbazoles into their respective corresponding imino unsubstituted carbazole isocyanates or imino unsubstituted carbazole diisocyanates by slowly adding the aminocarbazole or diaminocarbazole as a slurry in toluene to refluxing toluene saturated with phosgene, while continuously adding phosgene and heating the reaction mixture, and thereafter recovering imino unsubstituted carbazole isocyanate or imino unsubstituted carbazole diisocyanate.

Carbazole isothiocyanates are prepared by substituting thiophosgene for the phosgene in the above process.

Another process of the present invention comprises converting aminocarbazoles or diaminocarbazoles into their respective corresponding imino unsubstituted carbazole isothiocyanates and imino unsubstituted diisothiocyanates by reacting the aminocarbazoles or diaminocarbazoles with carbon disulfide and aqueous ammonia to produce the corresponding ammonium carbazole dithiocarbamate or ammonium carbazole bis(dithiocarbamate) and thereafter treating either in aqueous solution with a solution of lead nitrate in water, extracting with benzene, evaporating the benzene and recrystallizing the product from aqueous alcohol.

The following examples are directed to the preparation of specific carbazole compounds which are representative of those included within the general formula for these compounds set forth above.

*Example 1*

To 150 ml. of refluxing toluene saturated with phosgene was added during seven hours, nine grams of 3-aminocarbazole as a slurry in 400 ml. of toluene while phosgene was continuously bubbled through the mixture at a rate of about one gram per minute. The mixture was heated at reflux for an additional five hour period with continued phosgene addition, excess phosgene and hydrogen chloride being removed by passing a stream of carbon dioxide through the batch, and filtering the solution while hot. On cooling the toluene solution, 4.7 grams of carbazole-3-isocyanate (M.P. 183° C.–186° C.) was obtained and on evaporating a portion of the solvent an additional 2.9 grams of material (M.P. 180° C.–183° C.) precipitated. Recrystallization of the combined product produced white crystalline carbazole-3-isocyanate, M.P. 184° C.–186° C. From its empirical formula, the carbon and hydrogen content of carbazole-3-isocyanate is carbon 75.00 percent and hydrogen 3.85 percent; the material prepared analyzed 74.89 percent carbon and 4.09 percent hydrogen. Distinguishing features in its infrared spectrum were strong N—H (2.9 microns) and NCO (4.3 microns) absorption bands and a band at 13.35 microns, typical or mono 3-substituted carbazoles.

*Example 2*

Fifty grams of 3,6-diaminocarbazole, ground to −100 mesh, were added during 90 minutes as a slurry in 200 ml. of toluene to 300 ml. of refluxing toluene saturated with phosgene. The mixture was refluxed for five hours after addition of 3,6-diaminocarbazole was complete. Phosgene was continuously added to the reaction mixture at a rate of one gram per minute during the entire reaction period. At the conclusion of the reaction period the toluene solution was filtered hot and, on cooling, yielded 24.8 grams of carbazole-3,6-diisocyanate (M.P. 186° C.–189° C.). A small additional quantity of product (3.9 grams) was obtained by concentrating the toluene solution. Recrystallization of the product from boiling toluene containing activated carbon yielded white crystalline carbazole-3,6-diisocyanate, M.P. 201° C.–202° C. The calculated carbon and hydrogen content of carbazole-3,6-diisocyanate is carbon 67.47 percent and hydrogen 2.81 percent; the prepared material analyzed 67.98 percent carbon and 2.64 percent hydrogen. Distinguishing feature of its infrared spectrum included strong N—H (2.95 microns) and NCO (4.3 microns) absorption bands and absence of the band at 13.35 microns, which is present in 3-substituted but not in 3,6-disubstituted carbazoles. Diethyl carbazole-3,6-dicarbamate, formed by reaction of carbazole-3,6-diisocyanate with boiling ethanol, was recrystallized from chloroform as fine white needles; M.P. 202° C.–204° C. Its infrared spectrum showed no NCO absorption and strong carbonyl absorption at 5.85 microns.

*Example 3*

Eight grams of 1,8-dichloro-3,6-diaminocarbazole, prepared according to the method of Ziersch, Ber., 42, 3799 (1909), were treated with phosgene in refluxing toluene according to the method of Example 2. A first crop of four grams (M.P. 243° C.–253° C.) and a second crop, obtained on concentrating the solvent, of 3.1 grams (M.P. 221° C.–224° C.) of crude 1,8-dichlorocarbazole-3,6-diisocyanate were obtained. Recrystallization, twice, from hot chlorobenzene gave a product of M.P. 260° C.–264° C. The calculated composition of 1,8-dichlorocarbazole-3,6-diisocyanate is C 52.83 percent, H 1.51 percent, and Cl 22.32 percent; the recrystallized sample analyzed: C 52.88 percent, H 1.36 percent, and Cl 20.03 percent. The infrared spectrum of 1,8-dichlorocarbazole-3,6-diisocyanate showed the expected N—H (2.9 microns) and NCO (4.35 microns) bands. Its reaction product with ethanol, diethyl 1,8-dichlorocarbazole-3,6-dicarbamate, recrystallized from chloroform melts at 198° C.–200° C. and exhibited the anticipated infrared spectrum having N—H (3.05 microns) and carbonyl (5.9 microns) bands, and no NCO absorption.

*Example 4*

Ammonium carbazole-3-dithiocarbamate was prepared by the reaction of 3-aminocarbazole with carbon disulfide and aqueous ammonia. The ammonium carbazole-3-dithiocarbamate was then treated in aqueous solution with a solution of lead nitrate in water. The reaction mixture was extracted with benzene, the benzene evaporated, and the product recrystallized from aqueous alcohol. Carbazole-3-isothiocyanate, prepared in this way, melted at 188° C.–190° C., and showed infrared absorption bands for N—H (2.95 microns), NCS (4.7 microns) and 3-monosubstituted carbazoles (13.3 microns). An analysis of this material for sulfur showed a sulfur content of 14.76 percent; the theoretical sulfur content of $C_{13}H_8N_2S$ is 14.28 percent.

*Example 5*

3,6-diaminocarbazole treated according to the procedure of Example 4 produced carbazole-3,6-diisothiocyanate which was purified by successive crystallizations from aqueous acetone and from ethanol. It melts at 283° C.–286° C. with darkening and shows infrared absorption corresponding to N—H (2.9 microns) and NCS (4.7 microns) with the typical lack of absorption at 13.3 microns, also lacking for other 3,6-disubstituted carbazoles. Calculated for $C_{14}H_7N_3S_2$: S 22.77 percent; found: S 23.36 percent. A sample of carbazole-3,6-diisothiocyanate was refluxed for several hours with ethanol containing sodium ethoxide slightly in excess of the equivalent amount. The solution was cooled, diluted with water and acidified with hydrochloric acid to precipitate diethyl carbazole-3,6-bis(thiocarbamate). This ester, when recrystallized from petroleum ether containing a little ethanol, showed a melting point of 192° C.–193° C. with decomposition. It has the solubility in alkali typical of thiocarbamate esters and due to their ability to exist as enolic forms. The infrared spectrum of the ester shows N—H absorption in two modes (2.95 and 3.10 microns), C—N absorption at 6.45 microns, probable C—S absorption at 8.40 microns and lack of the absorption at 13.3 microns which characterizes 3-substituted but not 3,6-disubstituted carbazoles. These features of its spectrum serve to identify the material as an equilibrium mixture of the thioketonic and thioenolic forms of the ester.

What is claimed is:

1. A compound of the formula

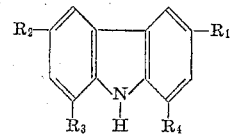

wherein the imino group at the 9 position of the molecule is unsubstituted; and wherein $R_1$ and $R_2$ are substituents selected from the group consisting of hydrogen, isocyanate, and isothiocyanate substituents, except that $R_1$ and $R_2$ cannot both be hydrogen substituents at the same time; and $R_3$ and $R_4$ are substituents selected from the group consisting of hydrogen and halogen.

2. Carbazole-3-isocyanate.
3. Carbazole-3-isothiocyanate.
4. Carbazole-3,6-diisocyanate.
5. Carbazole-3,6-diisothiocyanate.
6. 1,8-dichlorocarbazole-3,6-diisocyanate.
7. 1,8-dichlorocarbazole-3,6-diisothiocyanate.

References Cited in the file of this patent

Beilstein: Handbuch der organischen Chemie, Band XX H.W., 4th ed., pages 440–41 (1935).

Noller: Chemistry of Organic Compounds, 2nd ed., pages 317, 325 (1957), Saunders.